US 11,325,316 B2

(12) United States Patent
Yoshino

(10) Patent No.: US 11,325,316 B2
(45) Date of Patent: May 10, 2022

(54) CUSHION CONNECTING ROD OF SADDLED VEHICLE

(71) Applicant: HONDA MOTOR CO., LTD., Tokyo (JP)

(72) Inventor: Hiroki Yoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 553 days.

(21) Appl. No.: 16/253,615

(22) Filed: Jan. 22, 2019

(65) Prior Publication Data
US 2019/0224920 A1 Jul. 25, 2019

(30) Foreign Application Priority Data

Jan. 25, 2018 (JP) .............................. JP2018-010481

(51) Int. Cl.
B62K 11/02 (2006.01)
B62K 25/28 (2006.01)
(Continued)

(52) U.S. Cl.
CPC .......... B29C 65/02 (2013.01); B29C 65/4815 (2013.01); B29C 65/5057 (2013.01);
(Continued)

(58) Field of Classification Search
CPC . B29C 65/02; B29C 65/4815; B29C 65/5057; B29C 66/1122; B29C 66/301;
(Continued)

(56) References Cited

U.S. PATENT DOCUMENTS 4,830,391 A   5/1989  Silk
6,290,015 B1* 9/2001  Horii ...................... B62K 11/04
                                              180/219
(Continued)

FOREIGN PATENT DOCUMENTS

CN    203544262 U    4/2014
JP    57-124114 A    8/1982
(Continued)

OTHER PUBLICATIONS

Extended European Search Report, dated Jun. 25, 2019, for European Application No. 19151729.1.
(Continued)

Primary Examiner — Tony H Winner
Assistant Examiner — Michael R Stabley
(74) Attorney, Agent, or Firm — Birch, Stewart, Kolasch & Birch, LLP

(57) ABSTRACT

A cushion connecting rod of a saddled vehicle is configured in such a manner that an initial failure condition can be visually recognized in combination with fiber composite material and metal without using a special adhesive. A cushion connecting rod as a long member applied with a load when a swing arm is swung against a springing force of a rear cushion is configured in such a manner that a part of a surface of a metallic member is covered with an endless fiber-reinforced plastic. The fiber-reinforced plastic adheres to the surface of the metallic member with a film adhesive. Supporting portions applied with the load are provided at both ends in a longitudinal direction of the metallic member. A recessed portion and a plurality of lightening holes are formed between the supporting portions at both the ends, the recessed portion being configured in such a manner that a thickness dimension of the metallic member is set to be smaller than a thickness dimension of the supporting por- (Continued)

tions. The fiber-reinforced plastic covers surfaces of the supporting portions and the recessed portion.

6 Claims, 8 Drawing Sheets

(51) Int. Cl.
| | |
|---|---|
| *B29C 65/02* | (2006.01) |
| *B29C 65/48* | (2006.01) |
| *B29C 65/00* | (2006.01) |
| *B29C 70/30* | (2006.01) |
| *B29C 65/50* | (2006.01) |
| B29L 31/30 | (2006.01) |
| B32B 27/28 | (2006.01) |
| B32B 37/04 | (2006.01) |

(52) U.S. Cl.
CPC ........ *B29C 66/1122* (2013.01); *B29C 66/301* (2013.01); *B29C 66/712* (2013.01); *B29C 66/7212* (2013.01); *B29C 66/72141* (2013.01); *B29C 70/30* (2013.01); *B62K 11/02* (2013.01); *B62K 25/283* (2013.01); *B62K 25/286* (2013.01); *B29L 2031/3091* (2013.01); *B32B 27/28* (2013.01); *B32B 37/04* (2013.01); *B32B 2260/021* (2013.01); *B32B 2260/046* (2013.01); *B32B 2262/106* (2013.01); *B32B 2307/54* (2013.01)

(58) Field of Classification Search
CPC ..... B29C 66/712; B62K 11/02; B62K 25/283; B62K 25/286
See application file for complete search history.

(56) References Cited

U.S. PATENT DOCUMENTS

| | | | | |
|---|---|---|---|---|
| 6,481,523 B1* | 11/2002 | Noro | .................... | B62K 25/283 180/227 |
| 7,159,885 B2 | 1/2007 | Toyoda et al. | | |
| 7,226,066 B2* | 6/2007 | Ichihara | ............... | B62K 25/283 180/227 |
| 7,559,566 B2* | 7/2009 | Fujita | .................... | B62K 25/283 180/218 |
| 8,186,470 B2* | 5/2012 | Matayoshi | ............ | B60T 8/3685 180/227 |
| 8,474,566 B2* | 7/2013 | Nimura | .................. | B62M 17/00 180/226 |
| 8,550,201 B2 | 10/2013 | Uchiyama et al. | | |
| 8,851,222 B1* | 10/2014 | Katsura | ................ | B62K 25/286 180/227 |
| 9,487,260 B1* | 11/2016 | Seehorn | ............... | B62K 25/286 |
| 9,505,458 B2* | 11/2016 | Tomura | ................ | B62K 25/283 |
| 2002/0027035 A1* | 3/2002 | Gogo | .................. | B62K 25/283 180/227 |
| 2002/0144850 A1* | 10/2002 | Gogo | .................. | B62K 25/283 180/227 |
| 2003/0006577 A1* | 1/2003 | Toyoda | ................ | B62K 25/283 280/227 |
| 2014/0127521 A1 | 5/2014 | Ishibashi et al. | | |
| 2015/0076792 A1 | 3/2015 | Stillwell et al. | | |
| 2016/0031511 A1 | 2/2016 | Tomura et al. | | |

FOREIGN PATENT DOCUMENTS

| | | | | |
|---|---|---|---|---|
| JP | S57124114 | * | 8/1982 | ................ F16C 7/00 |
| JP | 6-280849 A | | 10/1994 | |
| JP | 7-112690 A | | 5/1995 | |
| KR | 10-0558424 B1 | | 3/2006 | |
| WO | WO 2012/137554 A1 | | 10/2012 | |

OTHER PUBLICATIONS

Chinese Office Action and Search Report dated Mar. 30, 2020, for Chinese Application No. 201910061975.8, with partial translation.

* cited by examiner

CUSHION CONNECTING ROD OF SADDLED VEHICLE

TECHNICAL FIELD

The present invention relates to a cushion connecting rod of a saddled vehicle, and especially relates to a cushion connecting rod of a motorcycle with a tensile load acing on in association with swinging motion of a swing arm.

BACKGROUND ART

Recently, in order to promote a reduction in weight of a vehicle, such an attempt is performed that the existing constituent components formed of metal or the like are replaced with fiber-reinforced plastics with fiber material solidified by synthetic resin.

Patent Literature 1 discloses components for an automobile formed by bonding to each other a fiber-reinforced plastic member with textile materials orientated in one direction and a fiber-reinforced plastic member with the textile materials orientated at random in multiple directions.

CITATION LIST

Patent Literature

Patent Literature 1: WO 2012/137554

SUMMARY OF INVENTION

Technical Problem

When a stress exceeding a strength margin acts on the fiber-reinforced plastic member, the fiber-reinforced plastic member may be shifted at a stretch from a visually unrecognizable initial failure condition to a failure condition such as bending and rupture. For this reason, the fiber-reinforced plastic member is less likely to be applied to constituent components applied with the stress. If employing multiple materialization with some of the constituent components replaced with the fiber-reinforced plastic, the fiber-reinforced plastic member is easily applied to the constituent components applied with the stress. However, it takes time and cost to develop an adhesive for firmly bonding both the fiber-reinforced plastics and the constituent components having different material characteristics.

An object of the present invention is to provide a cushion connecting rod of a saddled vehicle configured in such a manner that an initial failure condition can be visually recognized in combination with fiber composite material and metal without using a special adhesive.

Solution to Problems

To achieve the afore-mentioned object, the present invention has a first feature in a cushion connecting rod of a saddled vehicle applied to a motorcycle (1), the motorcycle (1) including a swing arm (17), a rear cushion (15), a link plate (30), and a cushion connecting rod (40), the swing arm (17) rotatably supporting a rear wheel (WR) and also being swingably attached to a vehicle body frame (2), the rear cushion (15) applying swinging reaction to the swing arm (17), the link plate (30) supporting the rear cushion (15) and the swing arm (17) in a mutually swingable manner, the cushion connecting rod (40) swingably supporting one end of the link plate (30) to the vehicle body frame (2), wherein the cushion connecting rod (40) is a long member applied with a load (F) when the swing arm (17) is swung against springing force of the rear cushion (15), the cushion connecting rod (40) is configured in such a manner that a part of a surface of a metallic member (60) is covered with an endless fiber-reinforced plastic (50), and the fiber-reinforced plastic (50) adheres to the surface of the metallic member (60) with a film adhesive (52).

The present invention has a second feature in that the metallic member (60) has both ends in a longitudinal direction provided with respective supporting portions (61) applied with the load (F), a recessed portion (C) and a plurality of lightening holes (62, 65, 66) are formed between the supporting portions (61) at both the ends, the recessed portion (C) being configured in such a manner that a thickness dimension (T) of the metallic member (60) is set to be smaller than a thickness dimension (Ta) of the supporting portions (61), and the fiber-reinforced plastic (50) covers surfaces of at least the supporting portions (61) and the recessed portion (C).

The present invention has a third feature in that the fiber-reinforced plastic (50) is configured in such a manner that long beltlike material (51) is wound around the surface of the metallic member (60) by a plurality of times.

The present invention has a fourth feature in that a fiber direction of the fiber-reinforced plastic (50) is arranged along a longitudinal direction of the beltlike material (51).

The present invention has a fifth feature in that the recessed portion (C) formed in the metallic member (60) is configured with a linear portion (A) and inclined portions (B), the linear portion (A) having the thickness dimension (T) kept constant in approximately the center in the longitudinal direction, the inclined portions (B) having the thickness dimensions gradually increasing from both ends of the linear portion (A) toward the respective supporting portions (61).

Advantageous Effects of Invention

According to the first feature, a cushion connecting rod of a saddled vehicle applied to a motorcycle (1), the motorcycle (1) including a swing arm (17), a rear cushion (15), a link plate (30), and a cushion connecting rod (40), the swing arm (17) rotatably supporting a rear wheel (WR) and also being swingably attached to a vehicle body frame (2), the rear cushion (15) applying swinging reaction to the swing arm (17), the link plate (30) supporting the rear cushion (15) and the swing arm (17) in a mutually swingable manner, the cushion connecting rod (40) swingably supporting one end of the link plate (30) to the vehicle body frame (2), wherein the cushion connecting rod (40) is a long member applied with a load (F) when the swing arm (17) is swung against springing force of the rear cushion (15), the cushion connecting rod (40) is configured in such a manner that a part of a surface of a metallic member (60) is covered with an endless fiber-reinforced plastic (50), and the fiber-reinforced plastic (50) adheres to the surface of the metallic member (60) with a film adhesive (52). Therefore, when the tensile load exceeding the strength margin of the metallic member is applied to the cushion connecting rod, a condition that the fiber-reinforced plastic is separated from the metallic member in association with deformation of the metallic member can be visually recognized. Even in this case, the cushion connecting rod can maintain its functions unless the endless fiber-reinforced plastic is not ruptured. For this reason, before causing malfunction, replacement can be performed.

According to the second feature, the metallic member (60) has both ends in a longitudinal direction provided with respective supporting portions (61) applied with the load (F), a recessed portion (C) and a plurality of lightening holes (62, 65, 66) are formed between the supporting portions (61) at both the ends, the recessed portion (C) being configured in such a manner that a thickness dimension (T) of the metallic member (60) is set to be smaller than a thickness dimension (Ta) of the supporting portions (61), and the fiber-reinforced plastic (50) covers surfaces of at least the supporting portions (61) and the recessed portion (C). Therefore, when the tensile load exceeding the strength margin is applied to the cushion connecting rod, especially, the fiber-reinforced plastic in a portion adhering to the recessed portion receives force in a direction separated from the metallic member. For this reason, separation of the fiber-reinforced plastic is easily caused in the recessed portion, and time for replacement of the cushion connecting rod can be visually easily recognized. A reduction in weight of the metallic member can be achieved by forming a plurality of lightening holes. As a result, a reduction in weight of the vehicle body can be promoted while suppressing rigidity of the cushion connecting rod to a necessary minimum degree.

According to the third feature, the fiber-reinforced plastic (50) is configured in such a manner that long beltlike material (51) is wound around the surface of the metallic member (60) by a plurality of times. Therefore, the long beltlike material is wound around. For this reason, incisal edges of the material are less likely generated, and a yield in a manufacturing process of the fiber-reinforced plastic can be improved. Also, a winding process is mechanized, thereby eliminating a process to manually putting the materials on. For this reason, production man-hours can be reduced.

According to the fourth feature, a fiber direction of the fiber-reinforced plastic (50) is arranged along a longitudinal direction of the beltlike material (51). Therefore, since the fiber-reinforced plastic formed of a plurality of layers is made by winding the beltlike material around the metallic member, the entire layered fiber materials are connected. For this reason, a proof tensile load of the cushion connecting rod is increased. Also, since the fiber direction is kept constant, bonding strength between the layers is also increased, and separation between the layers is less likely caused.

According to the fourth feature, the recessed portion (C) formed in the metallic member (60) is configured with a linear portion (A) and inclined portions (B), the linear portion (A) having the thickness dimension (T) kept constant in approximately the center in the longitudinal direction, the inclined portions (B) having the thickness dimensions gradually increasing from both ends of the linear portion (A) toward the respective supporting portions (61). Therefore, when the tensile load exceeding the strength margin is applied to the cushion connecting rod, force to separate the fiber-reinforced plastic acts on a connection point between the linear portion and the inclined portions, and the separation of the fiber-reinforced plastic is easily caused at the connection point. For this reason, time for replacement of the cushion connecting rod is more easily confirmed visually.

BRIEF DESCRIPTION OF DRAWINGS

FIG. 7 is a side view of the cushion connecting rod showing the manner in which the tensile load F acts on.

SOLUTION TO PROBLEM

Figure 1:
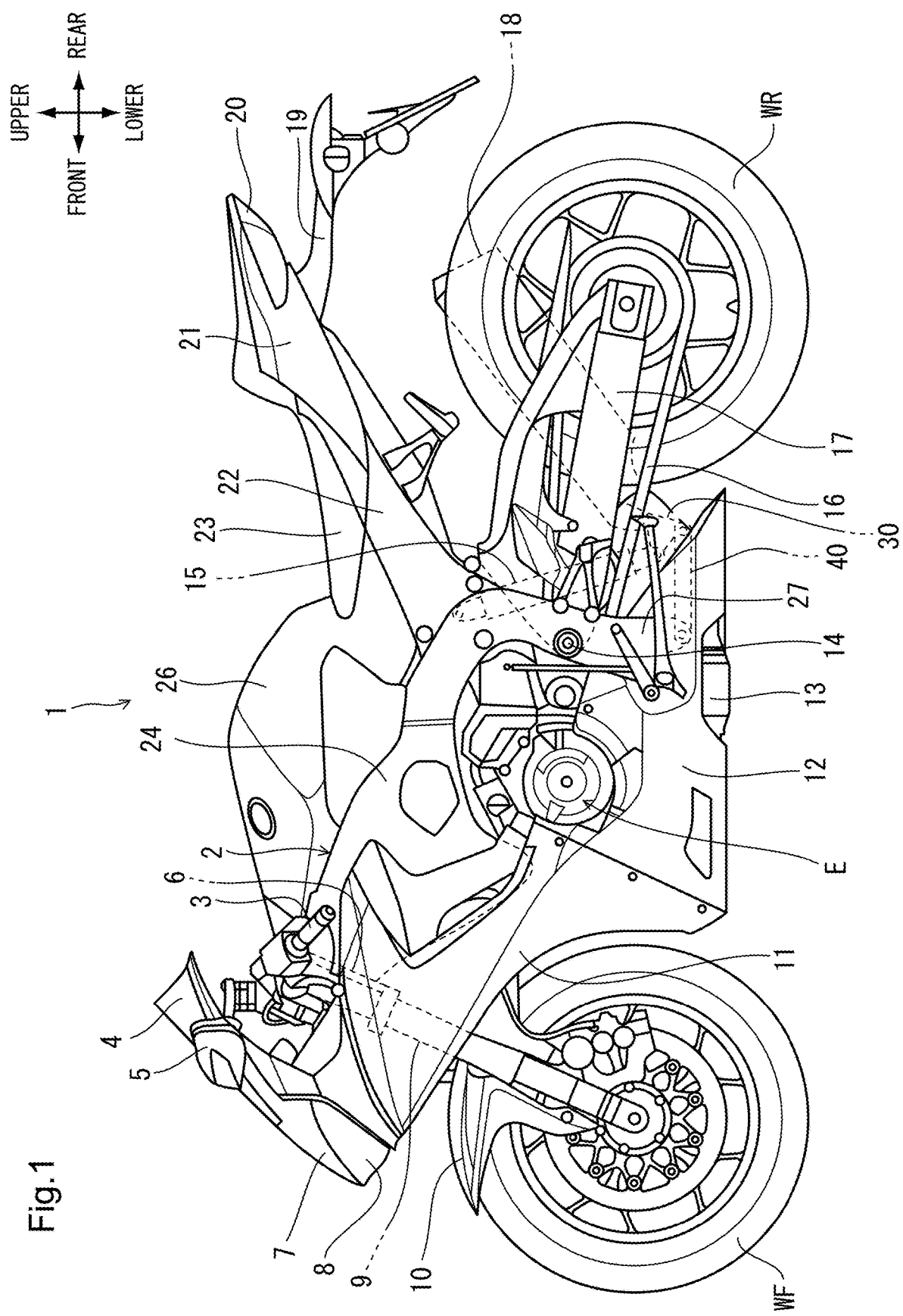
FIG. 1 is a left side view of a motorcycle applied with a cushion connecting rod according to one embodiment of the present invention.

A preferred embodiment of the present invention will be detailedly described below with reference to drawings. FIG. 1 is a left side view of a motorcycle 1 applied with a cushion connecting rod 40 according to one embodiment of the present invention. A vehicle body frame 2 of the motorcycle 1 as a saddled vehicle has a pair of right and left main frames 24 extended to the rear of a vehicle body from a head pipe 6 and curved downward. A pair of right and left front forks 9 rotatably supporting a front wheel WF is supported by a steering stem (unillustrated) swingably journaled to the head pipe 6. A steering handlebar 3 is fixed to an upper portion of the front forks 9.

A pair of right and left pivot plates 27 for supporting a pivot 14 swingably supporting a swing arm 17 is coupled to rear lower portions of the main frames 24. An engine E as a power source is fixed below the main frames 24. Combustion gas from the engine E is introduced to a muffler 18 on a right side in a vehicle width direction through an exhaust pipe 13. Driving force of the engine E is transmitted to a rear wheel WR through a drive chain 16, the rear wheel WR being rotatably journaled to a rear end of the swing arm 17.

A front cowl 7 for supporting a head light 8 is arranged in front of the head pipe 6. A windbreak screen 4 and a pair of right and left rear view mirrors 5 are attached to an upper portion of the front cowl 7. A pair of right and left side cowls 11 is coupled to a lower portion of the front cowl 7, and an under cowl 12 for covering a lower portion of the engine E is coupled to lower ends of the side cowls 11. A front fender 10 for covering an upper portion of the front wheel WF is fixed to the front forks 9.

A fuel tank 26 is arranged above the main frames 24. A rear frame 22 for supporting a seat 23 and a rear cowl 21 is coupled to rear portions of upper ends of the pivot plates 27. A taillight device 20 is provided at a rear end of the rear cowl 21, and a rear fender 19 is arranged below the taillight device 20.

A rear cushion 15 for applying reaction and damping force to the swinging motion of the swing arm 17 couples the vehicle body frame 2 and the swing arm 17 to each other through a link plate 30 having an approximately triangular shape in a side view of the vehicle body. More specifically, an upper end of the rear cushion 15 arranged in the center in the vehicle width direction is journaled to the vehicle body frame 2 in a position between the pair of right and left pivot plates 27, and a lower end of the rear cushion 15 is journaled to a front end of the link plate 30. A rear upper end of the link plate 30 is journaled to a lower portion of the swing arm 17, and a lower end of the link plate 30 is journaled to a lower portion of the pivot plate 27 through the cushion connecting rod 40 according to the present invention.

Figure 2:
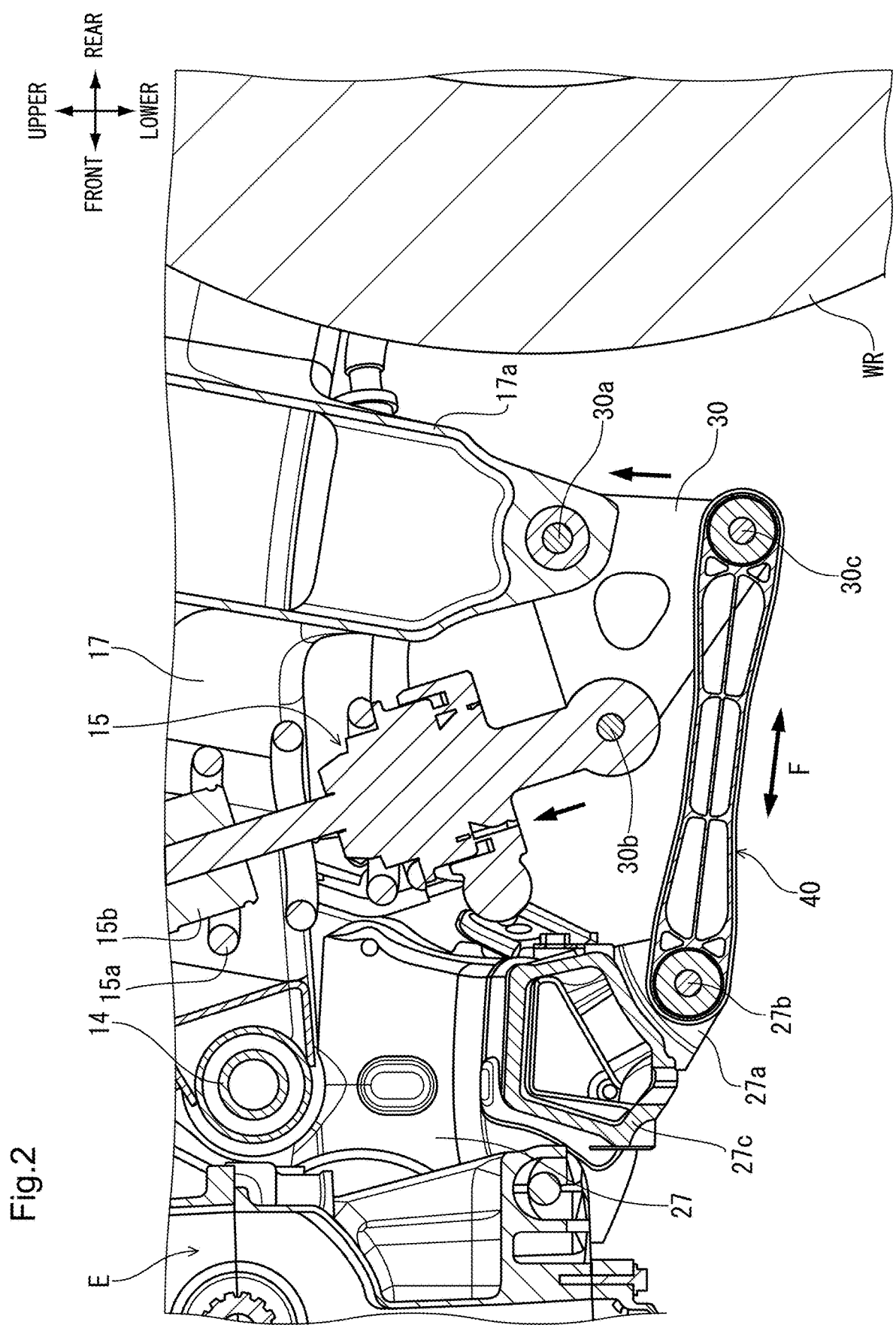
FIG. 2 is a left side view showing an arrangement structure of the cushion connecting rod.

FIG. 2 is a left side view showing an arrangement structure of the cushion connecting rod 40, and shows a cut surface of the motorcycle 1 in approximately the center in the vehicle width direction. The rear cushion 15 having a spring 15a for generating the springing force and a damper mechanism 15b for generating the damping force is arranged in a position behind the pivot 14 while being directed in a vertical direction through a through hole formed in the swing arm 17. The link plate 30 is made of a pair of metallic plates such as aluminum, formed in the vehicle width direction.

As has been previously described, the rear upper end of the link plate 30 is journaled to an extension portion 17a extended downward from the swing arm 17 by a swing shaft 30a formed of a bolt or the like. The front end of the link plate 30 is journaled to a lower end of the rear cushion 15 by a swing shaft 30b. A lower end of the link plate 30 is journaled to a rear end of the cushion connecting rod 40 by a swing shaft 30c. A front end of the cushion connecting rod 40 is journaled to a supporting portion 27a by a swing shaft 27b. The cushion connecting rod 40 is formed into a long rod shape directed in approximately a longitudinal direction of the vehicle body, the supporting portion 27a is formed in approximately the center of a coupling frame 27c, and the coupling frame 27c couples the right and left pivot plates 27 in the vehicle width direction to each other. A bearing or a collar member is appropriately applied to each journaling portion.

With the above-described configuration, when the swing arm 17 is swung upward against the springing force of the rear cushion 15, the rear cushion 15 is contracted while the link plate 30 is pulled upward. As a result, the tensile load F is generated with respect to the cushion connecting rod 40 for supporting the lower end of the link plate 30.

Figure 3:
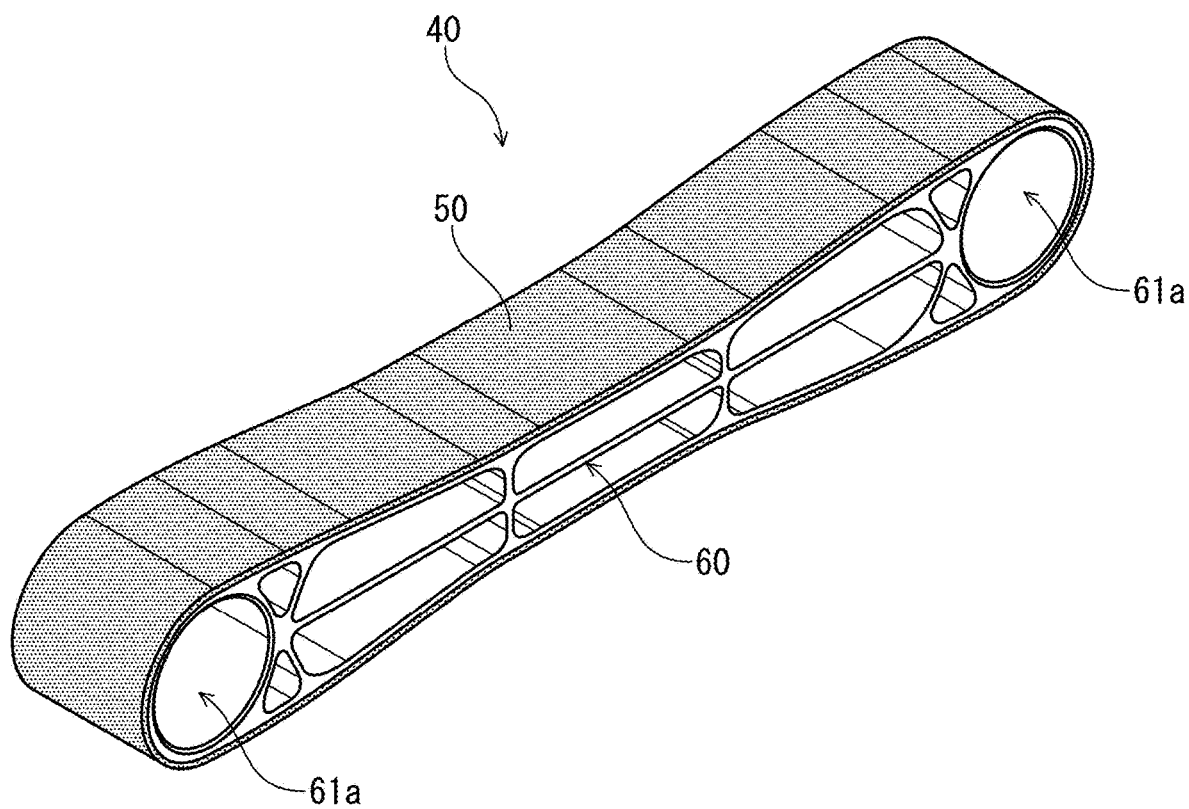
FIG. 3 is a perspective view of the cushion connecting rod.
Figure 4A:
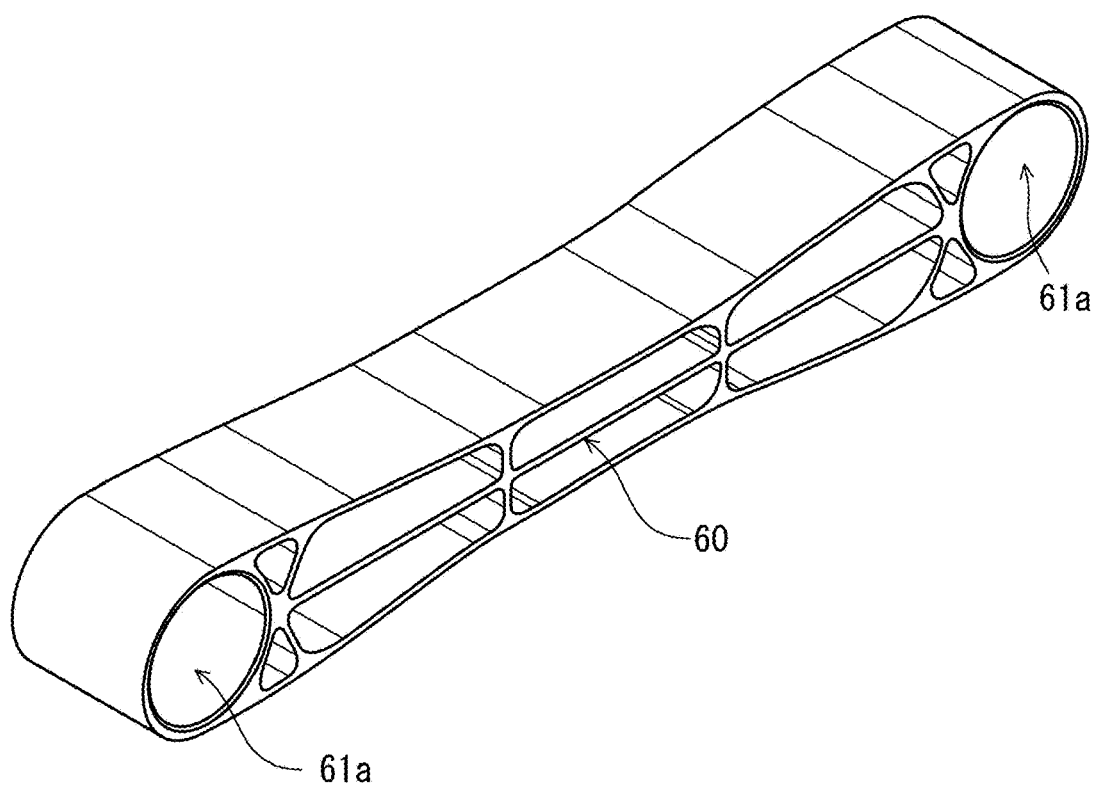
FIG. 4A is a perspective view of a metallic member composing the cushion connecting rod.
Figure 4B:
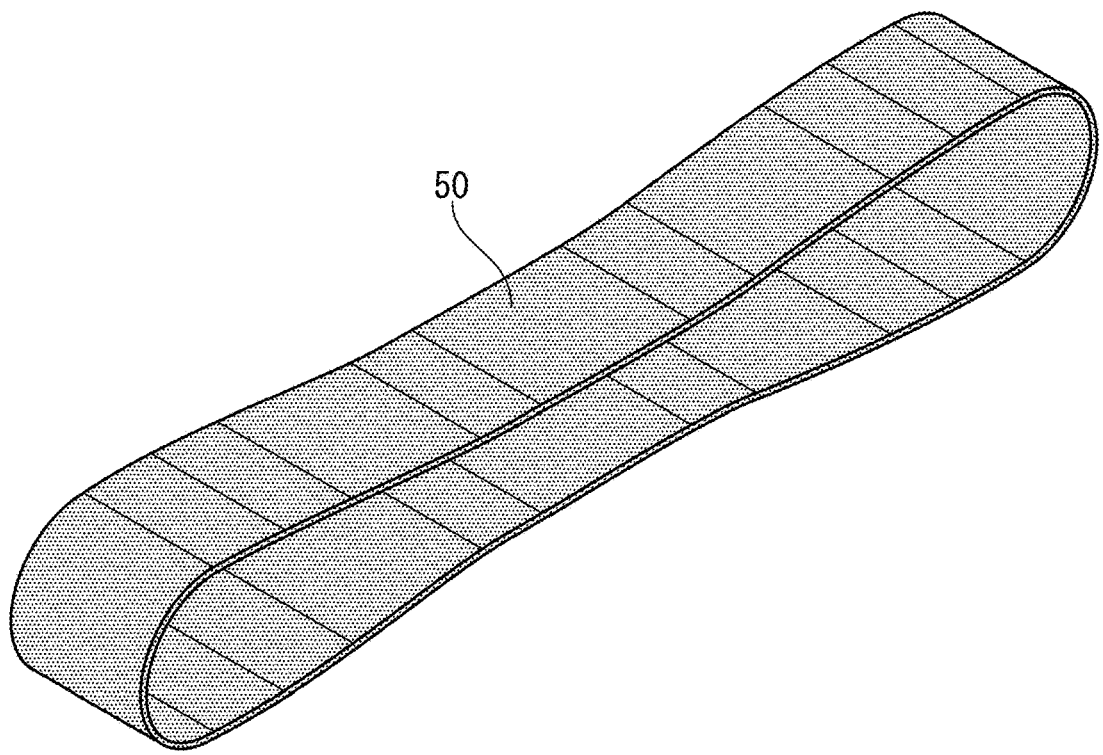
FIG. 4B is a perspective view of a fiber-reinforced plastic composing the cushion connecting rod.

FIG. 3 is a perspective view of the cushion connecting rod 40. FIG. 4A is a perspective view of a metallic member 60 composing the cushion connecting rod 40. FIG. 4B is a perspective view of a fiber-reinforced plastic 50 composing the cushion connecting rod 40. Hereinafter, with regard to the cushion connecting rod 40 directed in the longitudinal direction of the vehicle body, a dimension in the longitudinal direction is referred to as "length", a dimension in the vertical direction is referred to as "thickness", and a dimension in the vehicle width direction (horizontal direction) is referred to as "width".

The cushion connecting rod 40 is configured in such a manner that the endless circular fiber-reinforced plastic 50 adheres with an adhesive to a surface of the metallic member 60 made of metal such as aluminum. The metallic member 60 is configured so that in addition to an outer shape, even through holes 61a for allowing the swing shafts to pass through and the lightening holes formed in the respective portions are symmetrically formed in the longitudinal direction of the vehicle body and the vertical direction. For this reason, the tensile load F applying to the metallic member 60 can balancedly act on the respective portions.

The cushion connecting rod 40 according to the present invention is configured as follows. The endless fiber-reinforced plastic 50 adheres to and is fixed to a periphery of the metallic member 60. For this reason, when applying the tensile load F exceeding the strength margin of the metallic member 60, it is possible not only to merely achieve the reduction in weight of the cushion connecting rod 40 but also to visually recognize the condition of separation of the fiber-reinforced plastic 50 from the metallic member 60. If it is possible to visually recognize the separation of the fiber-reinforced plastic 50, the replacement can be performed in an initial stage of the failure condition. For this reason, especially, in a vehicle for racing purpose, it becomes possible to promote the reduction in weight while suppressing the strength of the cushion connecting rod 40 to a necessary minimum degree.

The endless fiber-reinforced plastic 50 is configured as follows. The long beltlike material (see FIG. 6) formed by solidifying the fiber material such as carbon fibers and glass fibers by a synthetic resin is wound around the surface of the metallic member 60 by a plurality of times. The direction of the fiber material of the long beltlike material is formed along its longitudinal direction.

Figure 5:
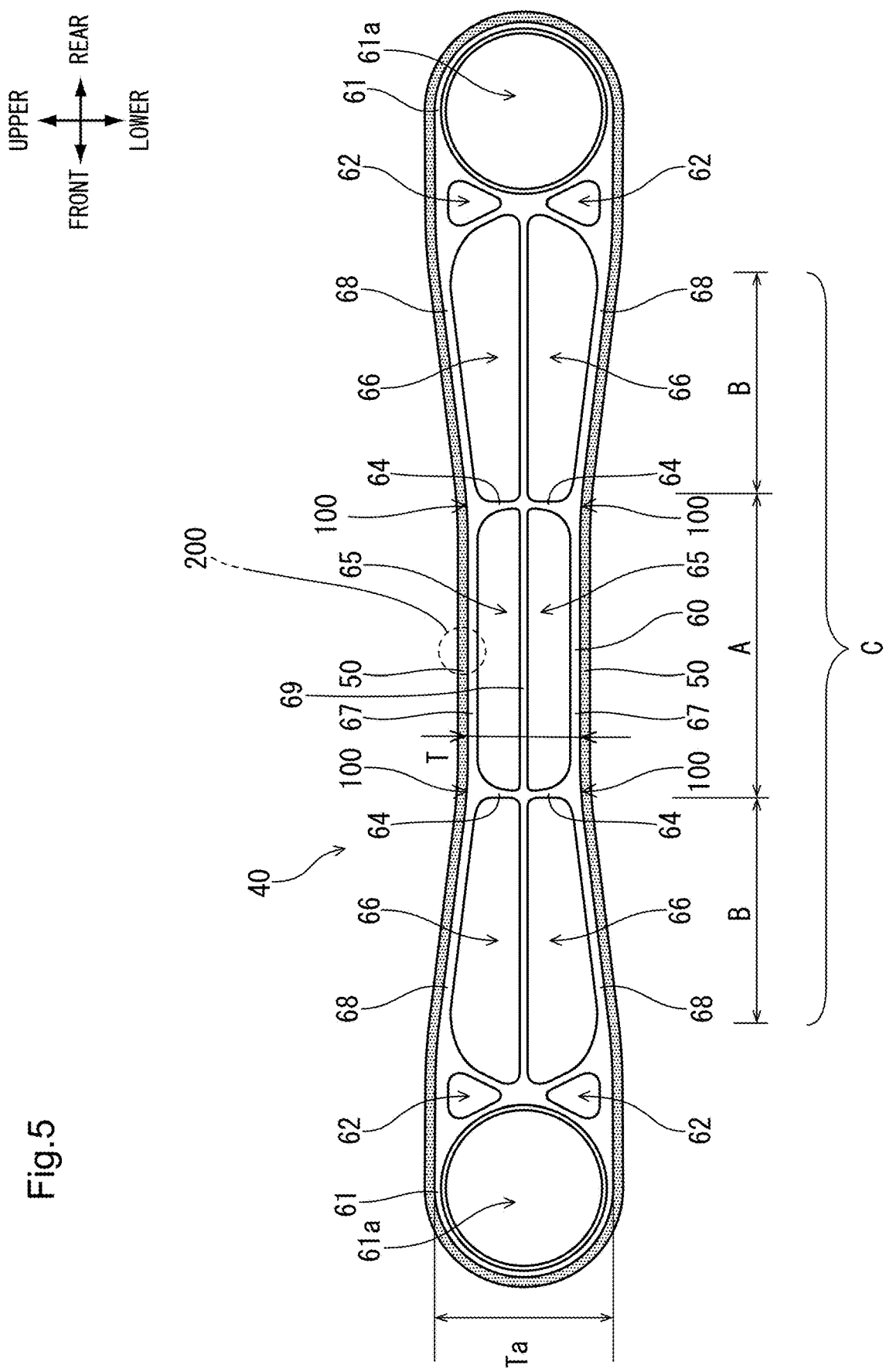
FIG. 5 is a side view of the cushion connecting rod.

FIG. 5 is a side view of the cushion connecting rod 40. Supporting portions 61 formed with the through holes 61a are provided at both the ends of the metallic member 60 of the cushion connecting rod 40. First lightening holes 65, second lightening holes 66 and third lightening holes 62 each having a vertically and bilaterally symmetrical shape are formed between the supporting portions 61 at both the ends.

In the center in the vertical direction of the metallic member 60, a platelike center rib 69 as a wall for dividing the upper first and lower second lightening holes 65, 66 from each other is arranged along a straight line for connecting the centers of the through holes 61a at both the ends. Four vertical ribs 64 in total as walls for dividing the first lightening holes 65 and the second lightening holes 66 from each other are provided on upper and lower sides of the center rib 69.

First outer walls 67 of the first lightening holes 65 and second outer walls 68 of the second lightening holes 66 configure the surface of the metallic member 60 with the fiber-reinforced plastic 50 adhering to. The fiber-reinforced plastic 50 adheres to surfaces of the first and second outer walls 67, 68 from arcuate outer peripheries of the supporting portions 61.

A recessed portion C having a thickness dimension smaller than a thickness dimension Ta measured in peripheries of the supporting portions 61 is formed in a position located nearer the center of the metallic member 60. More specifically, the first outer walls 67 arranged in parallel to the center rib 69 configure a linear portion A. The thickness dimension T of the metallic member 60 measured in the portions of the first outer walls 67 is set to be smaller than the thickness dimension Ta of the supporting portions 61. The second outer walls 68 connected to both the ends of the first outer walls 67 configure inclined portions B with the thickness dimension gradually increased from the thickness dimension T in the center toward the thickness dimension Ta at both the ends. The recessed portion C is configured with the linear portion A and the inclined portions B connected to both the ends of the linear portion A. The vertical ribs 64 of the metallic member 60 are arranged in positions corresponding to points 100 with the first outer walls 67 and the second outer walls 68 connected to each other.

Figure 6:
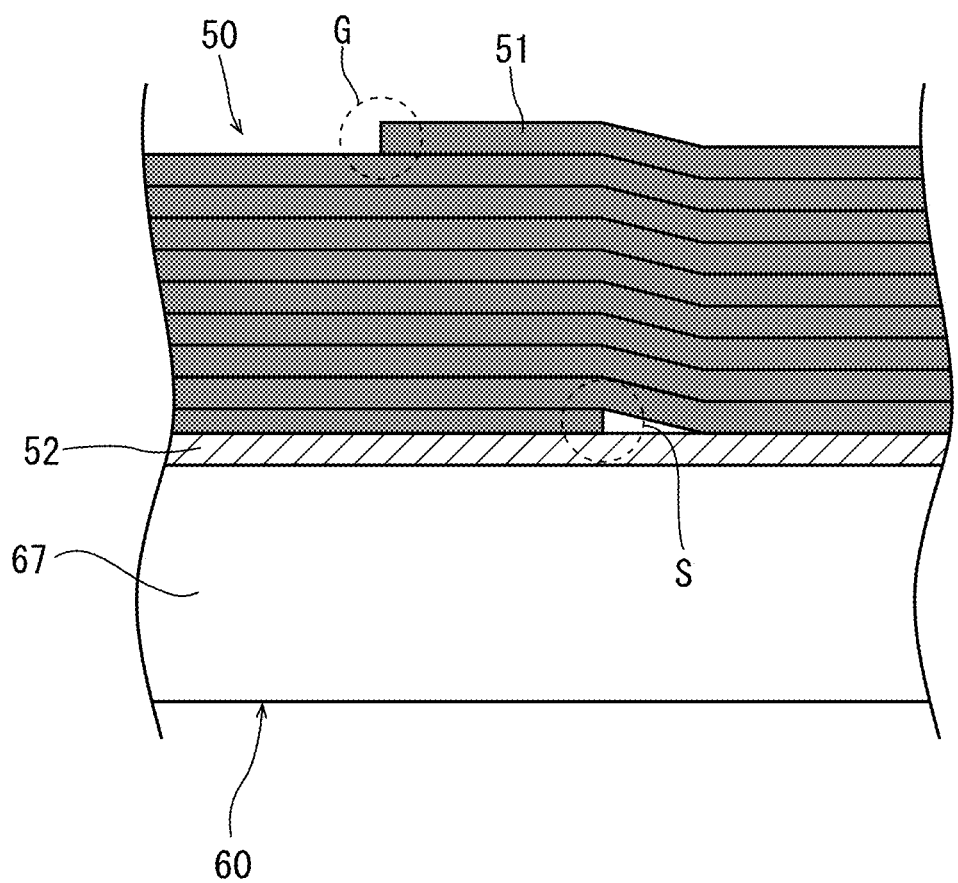
FIG. 6 is an enlarged view of a portion of a dashed circle shown in FIG. 5.

FIG. 6 is an enlarged view of a portion of a dashed circle 200 shown in FIG. 5. The fiber-reinforced plastic 50 is configured in such a manner that after a film adhesive 52 is put on the surface of the metallic member 60, the long beltlike material 51 is wound by a plurality of times (for example, 10 times) from a winding starting point S until a winding ending point G In this way, since the fiber-reinforced plastic 50 is configured by winding the long beltlike material 51, the incisal edges of the material are less likely generated, and the yield in a manufacturing process of the fiber-reinforced plastic 50 can be improved. Also, a winding process is mechanized, thereby eliminating a process to manually putting the materials on. As a result, production man-hours can be reduced. After the beltlike material 51 is wound, the whole is heated, so that the thermosetting adhesive 52 is hardened, and each portion between the mutual beltlike materials 51 is fixed.

The fiber-reinforced plastic 50 formed in this way is configured in such a manner that the fiber direction of the beltlike material 51 is arranged along the longitudinal direction. For this reason, the fiber materials of the entire layers are connected to each other. As a result, a proof tensile load of the cushion connecting rod 40 can be increased. Also, since the fiber direction is kept constant, the adhesion strength between the layers is also increased, and the separation between the layers is less likely caused.

Figure 7:
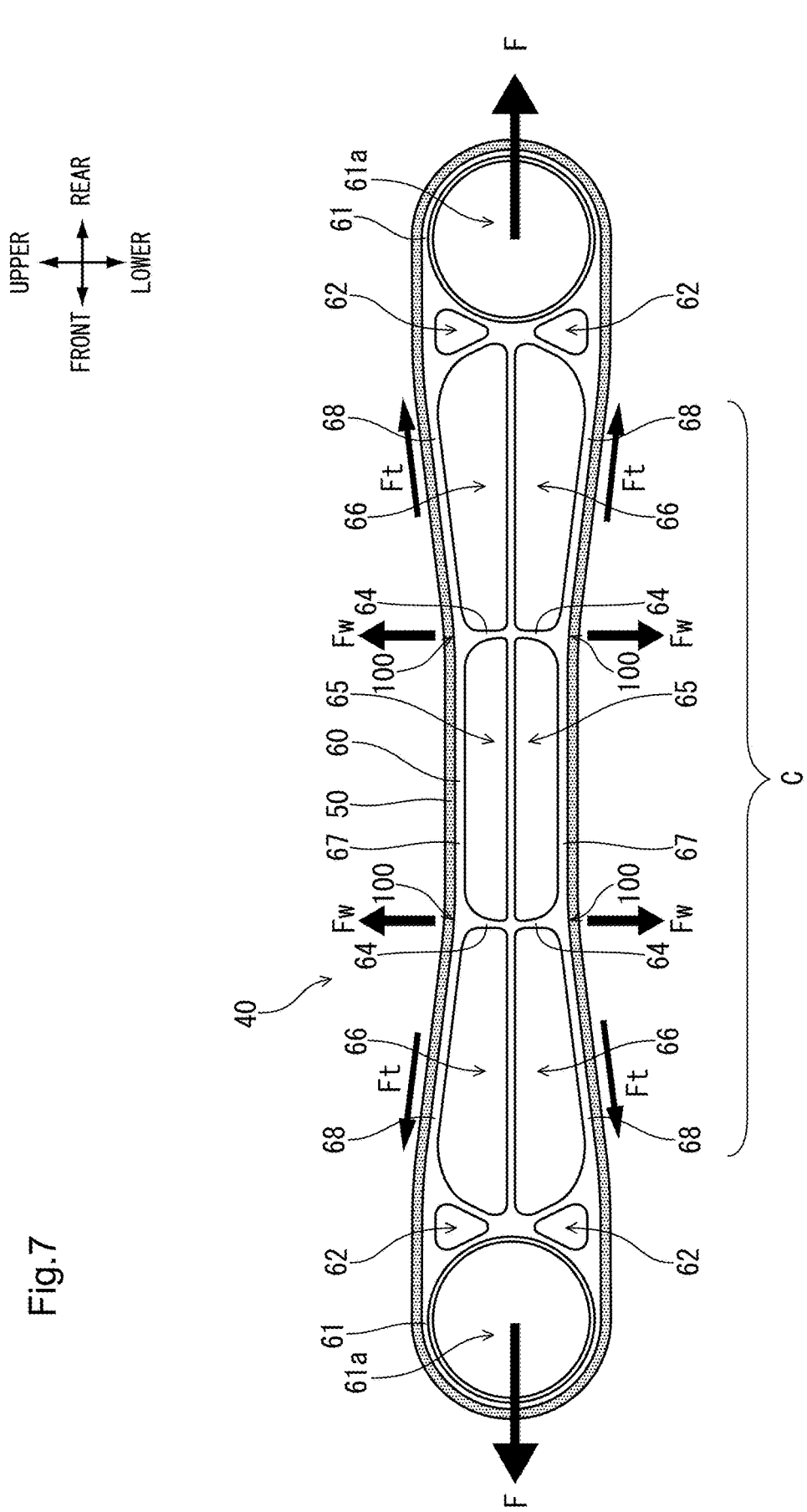
Figure 8:
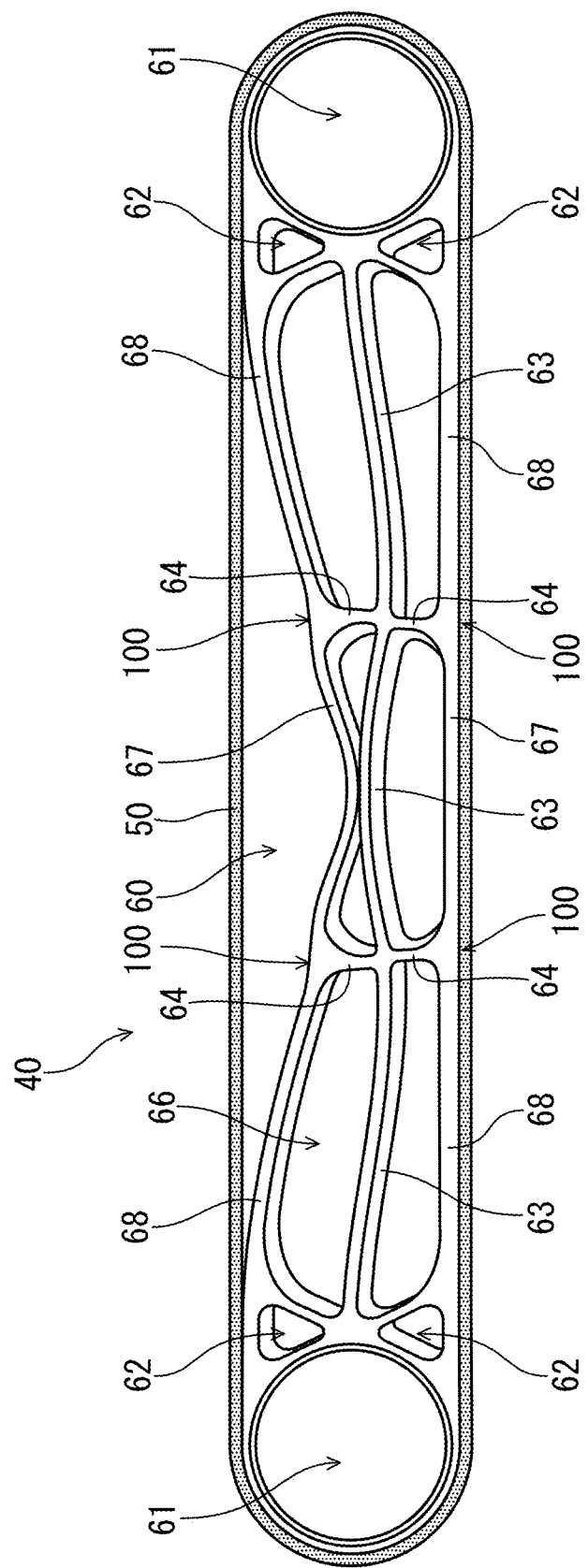
FIG. 8 is a side view of the damaged cushion connecting rod.

FIG. 7 is a side view of the cushion connecting rod 40 showing the manner in which the tensile load F acts on. FIG. 8 is a side view of the damaged cushion connecting rod 40. The tensile loads F applied to the supporting portions 61 of the cushion connecting rod 40 function as force to extend the metallic member 60 in the longitudinal direction, and also function as forces Fw in the vertical direction for separating the fiber-reinforced plastic 50 from the surface of the metallic member 60 by tension Ft acting on the fiber-reinforced plastic 50 in the recessed portion C. The proof tensile load until the cushion connecting rod 40 is put in the initial failure condition is affected by the tensile strength of the metallic member 60 and the peel resistance strength of the adhesive.

The forces Fw for separating the fiber-reinforced plastic 50 are concentrated in the points 100 with the first outer walls 67 and the second outer walls 68 coupled to each other. The vertical ribs 64 are provided in the positions corresponding to the points 100, and receive the tensile load toward the vertical direction. When the tensile load F exceeds the proof tensile load of the cushion connecting rod 40, the metallic member 60 is extended in the longitudinal direction, and also separation of the fiber-reinforced plastic 50 is started from the portions of the points 100 of the metallic member 60.

As shown in FIG. 5, since the recessed portion C of the metallic member 60 is configured with the linear portion A and the inclined portions B, when the tensile load F exceeding the strength margin is applied to the cushion connecting rod 40, the forces Fw for separating the fiber-reinforced plastic 50 are generated. Thereby, the fiber-reinforced plastic 50 is easily separated from the positions of the points 100. As a result, since the separation of the fiber-reinforced plastic 50 can be visually easily recognized at the points 100, time for replacement of the cushion connecting rod 40 can be more easily recognized.

FIG. 8 shows a state that the metallic member 60 is deformed such that the fiber-reinforced plastic 50 separated from the recessed portion C is made in a linear fashion. Even in this state, the cushion connecting rod 40 can maintain its function unless the endless fiber-reinforced plastic 50 is ruptured. For this reason, replacement can be performed before causing malfunction.

An orientating direction and an arrangement position of the cushion connecting rod, material and a shape of the metallic member, a shape of the lightening hole or the rib, material of the fiber-reinforced plastic, a shape of the beltlike material, the winding number of the beltlike material, material and a shape of the adhesive, and the like are not limited to the above-described embodiment, and various design modification can be made. For example, the shape of the metallic member may be an asymmetric shape in the longitudinal direction and the vertical direction according to characteristics and requirement of an applicable portion. The configuration that the metallic member is covered with the endless thermosetting resin is not limited to the cushion connecting rod of the motorcycle, and can be applied to various kinds of members applied with the tensile load, such as a cross pipe for the vehicle body frame, a seat frame, and a rod member for suspending the engine.

EXPLANATION OF SIGN

1 . . . saddled vehicle applied to a motorcycle, 15 . . . rear cushion, 30 . . . link plate, 40 . . . cushion connecting rod, 51 . . . long beltlike material, 52 . . . film adhesive, 60 . . . metallic member, 61 . . . supporting portions, 61a . . . through holes, 62 . . . third lightening holes, 64 . . . vertical ribs, 65 . . . first lightening holes, 66 . . . second lightening holes, 67 . . . first outer walls, 68 . . . second outer walls, 69 . . . center rib, 100 . . . points, A . . . linear portion, B . . . inclined portions, C . . . recessed portion, F . . . (tensile) load

The invention claimed is:

1. A cushion connecting rod of a saddled vehicle applied to a motorcycle, the motorcycle including a swing arm, a rear cushion, a link plate, and a cushion connecting rod, the swing arm rotatably supporting a rear wheel and also being swingably attached to a vehicle body frame, the rear cushion applying swinging reaction to the swing arm, the link plate supporting the rear cushion and the swing arm in a mutually swingable manner, the cushion connecting rod swingably supporting one end of the link plate to the vehicle body frame,
wherein the cushion connecting rod is a long member applied with a load when the swing arm is swung against a springing force of the rear cushion,
wherein the cushion connecting rod is configured in such a manner that a surface of a metallic member is covered with an endless circular fiber-reinforced plastic,
wherein the fiber-reinforced plastic adheres to the surface of the metallic member with a film adhesive,
wherein the metallic member has both ends in a longitudinal direction provided with respective supporting portions applied with the load,
wherein a recessed portion and a plurality of lightening holes are formed between the supporting portions at both the ends, the recessed portion being configured in such a manner that a thickness dimension of the metallic member is set to be smaller than a thickness dimension of the supporting portions, and
wherein the fiber-reinforced plastic covers surfaces of the supporting portions and the recessed portion.

2. The cushion connecting rod of a saddled vehicle according to claim 1, wherein the fiber-reinforced plastic is configured in such a manner that long belt-like material is wound around the surface of the metallic member a plurality of times.

3. The cushion connecting rod of a saddled vehicle according to claim 2, wherein a fiber direction of the fiber-reinforced plastic is arranged along a longitudinal direction of the belt-like material.

4. The cushion connecting rod of a saddled vehicle according to claim 3, wherein the recessed portion formed in the metallic member is configured with a linear portion and inclined portions, the linear portion having the thickness dimension kept constant in approximately the center in the longitudinal direction, the inclined portions having the thickness dimensions gradually increasing from both ends of the linear portion toward the respective supporting portions.

5. The cushion connecting rod of a saddled vehicle according to claim 2, wherein the recessed portion formed in the metallic member is configured with a linear portion and inclined portions, the linear portion having the thickness dimension kept constant in approximately the center in the longitudinal direction, the inclined portions having the thickness dimensions gradually increasing from both ends of the linear portion toward the respective supporting portions.

6. The cushion connecting rod of a saddled vehicle according to claim 1, wherein the recessed portion formed in the metallic member is configured with a linear portion and inclined portions, the linear portion having the thickness dimension kept constant in approximately the center in the longitudinal direction, the inclined portions having the thickness dimensions gradually increasing from both ends of the linear portion toward the respective supporting portions.

* * * * *